(No Model.)
A. E. LAMB.
STAND FOR SHARPENING STONES.
No. 496,741. Patented May 2, 1893.
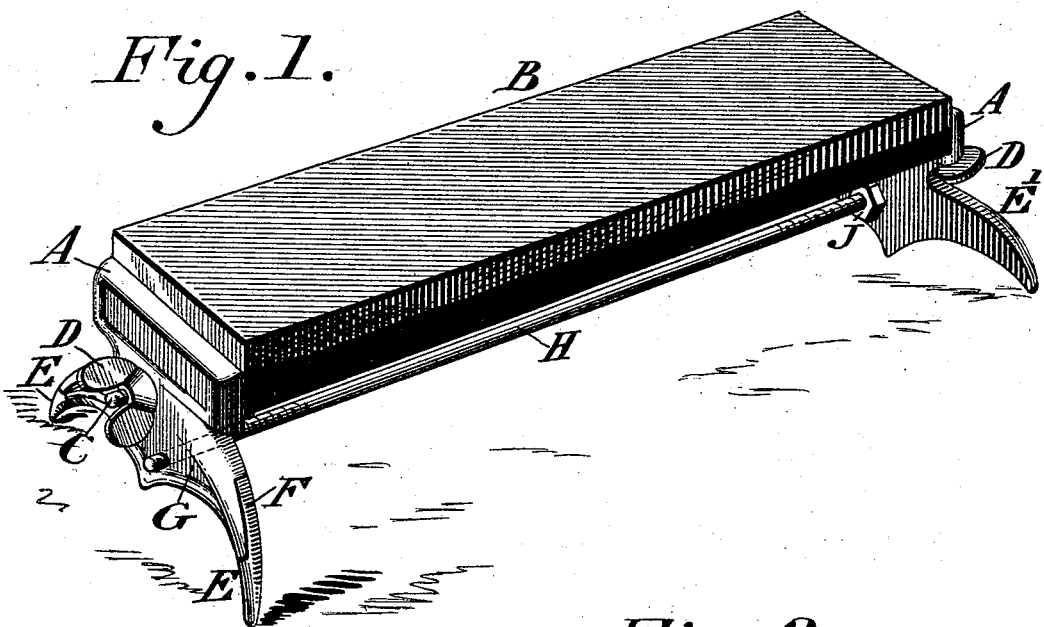
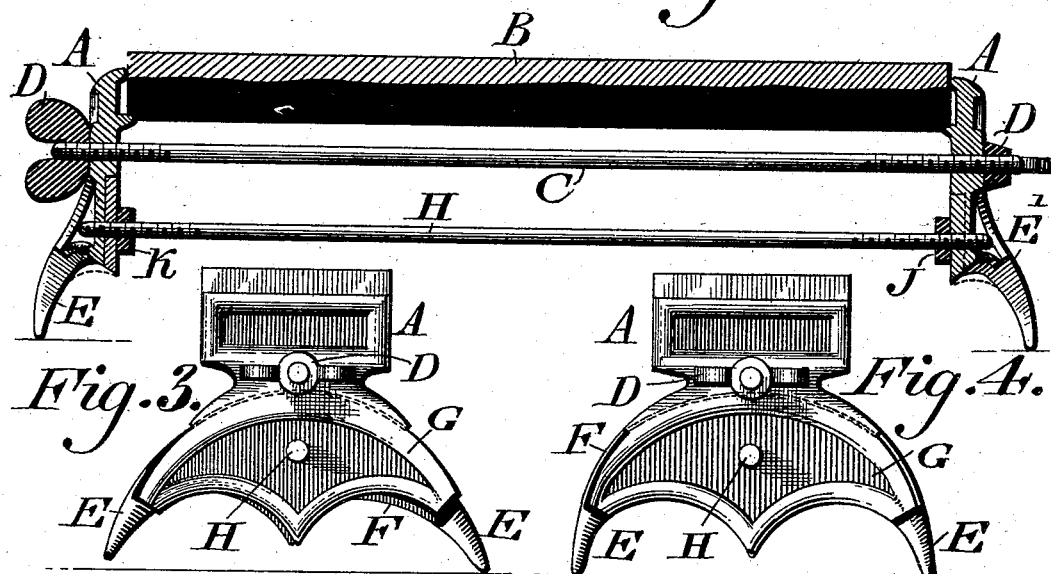
WITNESSES:
P. F. Nagle
L. Douville
INVENTOR
Addison E. Lamb
BY John A. Wiedersheim
ATTORNEY.
THE NORRIS PETERS CO., PHOTO-LITHO., WASHINGTON, D. C.

UNITED STATES PATENT OFFICE.

ADDISON E. LAMB, OF PHILADELPHIA, PENNSYLVANIA.

STAND FOR SHARPENING-STONES.

SPECIFICATION forming part of Letters Patent No. 496,741, dated May 2, 1893.

Application filed October 28, 1892. Serial No. 450,252. (No model.)

*To all whom it may concern:*

Be it known that I, ADDISON E. LAMB, a citizen of the United States, residing in the city and county of Philadelphia, State of Pennsylvania, have invented a new and useful Improvement in Stands for Sharpening-Stones, which improvement is fully set forth in the following specification and accompanying drawings.

My invention consists of a holder or stand for a sharpening stone, which is adapted to adjust itself to inequalities on a table or other support on which it is placed, so that the stone rests level and firmly in position, and is prevented from wabbling.

Figure 1 represents a perspective view of a holder or stand embodying my invention. Fig. 2 represents a longitudinal vertical section thereof. Figs. 3 and 4 represent end views thereof.

Similar letters of reference indicate corresponding parts in the several figures.

Referring to the drawings: A designates two plates which are applied to the ends of the sharpening stone B, and clamped thereto by means of a screw rod or bolt C, which is passed through said plates and nuts D which are fitted on the rod and tightened against said plates.

E, E' designates the legs of the stand, the same being connected with the clamping plates A, their lower ends being somewhat pointed to take firm hold of the table or support on which the stand is placed, so as to prevent slipping of the latter. The legs E' at one end are integral with or fixed on the plate, and the legs E on the other end are separated so that they form two sections F and G, the legs E proper being on the section F.

A screw rod or bolt H is connected with the legs E' and retained thereon by the nut J. The other end of said rod passes through the sections F and G, and is retained thereon by a nut K, it being noticed that the section G is journaled on said rod, whereby it may oscillate thereon.

The operation is as follows: The stand is placed on a table or other support and the legs rest flat thereon, so that when the stone is used, it will not shift or slip. When however, said support is irregular and one of the legs is raised from the same, see Fig. 3, the stone or stand is pressed down, whereby the section F turns on its axis, and thus both legs are caused to touch and rest upon the floor, thus leveling the stone, and causing the stand to take firm hold of the support, whereby shifting and wabbling of the same is prevented. The lower rod H is parallel with the upper rod C, and it serves, besides forming the axis of the section F, to prevent the legs E, E' from turning on said rod C, and in a measure acts as a brace or stiffener for said legs. Again, the rod C has the nuts D thereon for adjustment and tightening action of the clamping plates A, and the latter may also be adjusted relatively to the lower rod H, owing to the nuts J, K, so as to properly force out the plates in opposition to the inward action of the nuts D, and provide the proper pressure on the movable section F of the leg E, which section turns on said rod H should there be any irregularity in the table or other support of the stand, as has been stated.

In referring to a sharpening stone, I include all articles of the class, whether known as a sharpening or oil stone, hone, strop, &c.

If desired the legs E' may also be formed in sections as shown by the dotted lines Fig. 2, so as to produce results similar to the legs E.

Having thus described my invention, what I claim as new, and desire to secure by Letters Patent, is—

A stand for a sharpening stone, consisting of two end plates, one of which has a movable section, a connecting rod for said plates, with clamping nuts on said rod on the outer side of the plates, a parallel rod connecting said plates having the movable section journaled thereon, and clamping nuts on said parallel rod of the inner side of said plates, said parts being combined substantially as described.

ADDISON E. LAMB.

Witnesses:
JOHN A. WIEDERSHEIM,
A. P. JENNINGS.